United States Patent
Schwarzer

(10) Patent No.: US 9,412,091 B2
(45) Date of Patent: Aug. 9, 2016

(54) DYNAMIC ADAPTION OF ELECTRONIC ROUTING SLIPS FOR FINANCIAL MESSAGING

(71) Applicant: International Business Machines Corporation, Armonk, NY (US)

(72) Inventor: Holger Schwarzer, Boppelsen (CH)

(73) Assignee: International Business Machines Corporation, Armonk, NY (US)

(*) Notice: Subject to any disclaimer, the term of this patent is extended or adjusted under 35 U.S.C. 154(b) by 972 days.

(21) Appl. No.: 13/647,821

(22) Filed: Oct. 9, 2012

(65) Prior Publication Data

US 2014/0101265 A1    Apr. 10, 2014

(51) Int. Cl.
    *G06Q 10/00* (2012.01)
    *G06Q 10/10* (2012.01)
    *G06Q 40/02* (2012.01)

(52) U.S. Cl.
    CPC ............... *G06Q 10/10* (2013.01); *G06Q 40/02* (2013.01)

(58) Field of Classification Search
    CPC ............................ G06Q 10/10; G06Q 40/02
    See application file for complete search history.

(56) References Cited

U.S. PATENT DOCUMENTS

| 2002/0052771 | A1* | 5/2002 | Bacon ............. G06Q 10/06316 705/7.26 |
| 2006/0041628 | A1* | 2/2006 | Muller ................ G06Q 10/107 709/206 |
| 2009/0013047 | A1* | 1/2009 | Adreon ................. G06Q 10/10 709/206 |
| 2010/0306020 | A1* | 12/2010 | Lo .......................... G06Q 10/06 705/7.27 |
| 2011/0078426 | A1 | 3/2011 | Stoitsev |

OTHER PUBLICATIONS

Akhil Kumar et al. (Workflow support for electronic commerce applications, Decision Support Systems 32, 2002, 265-278).*
Gregor Hohpe and Bobby Woolf, "Enterprise Integration Patterns," Chapter 7 entitled 'Message Routing,' p. 324, Addison-Wesley 2009.
"Workflow Engine," Wikipedia, the Free Encyclopedia, page last modified Apr. 13, 2012 <http://en.wikipedia.org/wiki/Workflow_engine>.

* cited by examiner

*Primary Examiner* — Saleh Najjar
*Assistant Examiner* — Oleg Korsak
(74) *Attorney, Agent, or Firm* — Daniel R. Simek

(57) ABSTRACT

Embodiments of the present invention disclose a method, computer program product, and system for generating a routing slip for a message. A computer system determines an appropriate sub-flow for the message. The sub-flow dictates a sequence of processing steps for the message. The computer system generates a routing slip for the message based on the appropriate sub-flow. The routing slip provides an order for executing one or more processing steps of the sub-flow. The computer system associates the routing slip to the message. The processing steps of the sub-flow are executed by the computer system according to the routing slip. In an embodiment, the message is a financial message describing at least one financial transaction.

22 Claims, 4 Drawing Sheets

US 9,412,091 B2

DYNAMIC ADAPTION OF ELECTRONIC ROUTING SLIPS FOR FINANCIAL MESSAGING

FIELD OF THE INVENTION

The present invention relates generally to the field of financial messaging, and more particularly to generating and linking a routing slip to a financial message.

BACKGROUND OF THE INVENTION

In the business-to-business area of financial services, financial messaging is the backbone for processing financial transactions such as automated payments. Implementations of financial messaging solutions require high levels of straight-through processing (STP), and flexible process configurations. Straight-through processing (STP) allows a financial transaction to be conducted electronically and without requiring a user to manually input information. In existing implementations of a processing flow for a financial message, the message proceeds through one or more sets of decision tables which determine whether or not an activity should be processed for the financial message. The sets of decision tables may be referred to as sub-flows. The sub-flows can represent activities such as message validation, STP approval, compliance checks, or duplicate checks.

SUMMARY

Embodiments of the present invention disclose a method, computer program product, and system for generating a routing slip for a message. A computer system determines an appropriate sub-flow for the message. The sub-flow dictates a sequence of processing steps for the message. The computer system generates a routing slip for the message based on the appropriate sub-flow. The routing slip provides an order for executing one or more processing steps of the sub-flow. The computer system associates the routing slip to the message. The processing steps of the sub-flow are executed by the computer system according to the routing slip. In an embodiment, the message is a financial message describing at least one financial transaction.

DETAILED DESCRIPTION

Figure 1:
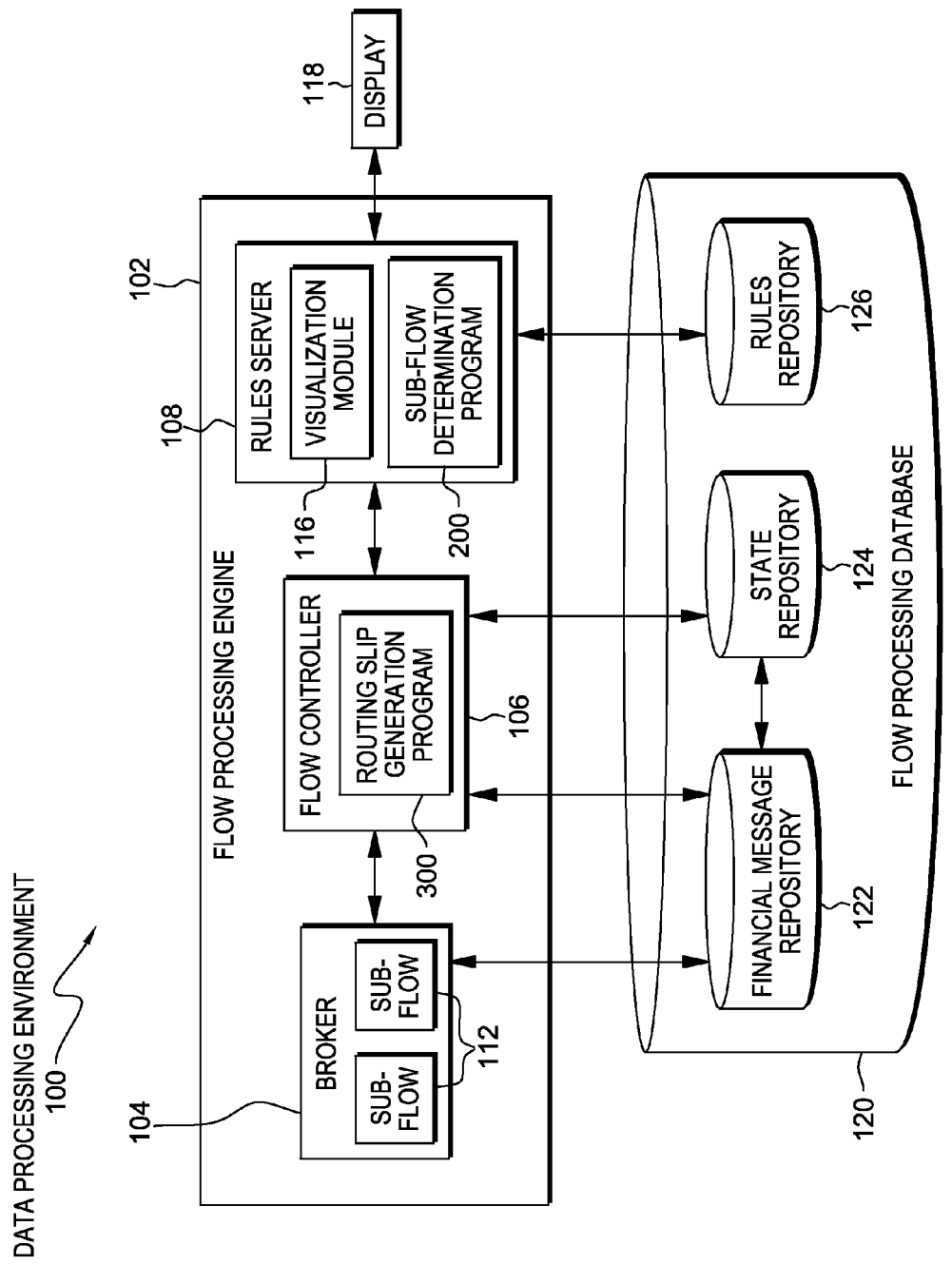
FIG. 1 is a functional block diagram illustrating a data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the figures. FIG. 1 is a functional block diagram illustrating a data processing environment 100, in accordance with one embodiment of the present invention.

Data processing environment 100 includes flow processing engine 102, display 118, and flow processing database 120. In an embodiment, the elements of data processing environment 100 can communicate through network connections such as a local area network (LAN), a telecommunications network, a wide area network (WAN) such as the Internet, or a combination of the three, and include wired, wireless, or fiber optic connections. Flow processing engine 102 is a collection of computing systems including broker 104, flow controller 106, and rules server 108. In various embodiments of the present invention, broker 104, flow controller 106, and rules server 108 may be desktop computers, specialized computer servers, or any other computer systems known in the art. In certain embodiments, broker 104, flow controller 106, and rules server 108 represent computer systems utilizing clustered computers and components (e.g., database server computers, application server computers, etc.) acting as a single pool of seamless resources when accessed through a network. In one embodiment, flow processing engine 102 can be a computer system including the elements of broker 104, flow controller 106 and rules server 108.

In one embodiment, broker 104 can process a financial message through sub-flow(s) 112. In an example, broker 104 includes sub-flow 112, as well as additional instances of sub-flows. Broker 104 can communicate with flow controller 106 by sending and receiving financial messages. Flow controller 106 directs the processing of financial messages and includes a routing slip generation program 300 is utilized for each financial message. Routing slip generation program 300 is utilized to generate a routing slip attached to a financial message responsive to sub-flows 112. Financial messages are processed by sub-flows 112, as discussed in greater detail with regard to FIG. 3. Sub-flows 112 dictate a series of processing steps for the financial message. A routing slip can specify a sub-flow 112 and the sequence of required processing steps through which the financial message needs to proceed. In one embodiment, flow controller 106 can communicate with broker 104 and rules server 108 by sending and receiving financial messages, and information corresponding to financial messages. Rules server 108 determines the appropriate sub-flow 112 and the sequence of financial message processing steps. In one embodiment, rules server 108 includes a sub-flow determination program 200 for determining appropriate sub-flow 112 and sequence of processing steps for a financial message responsive to information specific to the financial message, as discussed in greater detail with regard to FIG. 3. A visualization module 116 is included on rules server 108 and communicates with display 118. Visualization module 116 allows a user utilizing display 118 to input information regarding a financial message. In an example, when a financial message is created, a user can define processing steps and control information for the financial message by utilizing visualization module 116 and display 118. In an embodiment, the processing steps and control information for a financial message can be updated during the processing of the financial message through a user input into display 118 and visualization module 116. Rules server 108 can allow a user to modify processing steps and information for the financial message. In one embodiment, rules server 108 can communicate with flow controller 106 by sending and receiving information regarding financial messages.

Flow processing database 120 includes financial message repository 122, state repository 124, and rules repository 126. The elements of flow processing database 120 (financial message repository 122, state repository 124, and rules repository 126) may be implemented with any database storage device capable of storing financial messages and information corresponding to the state of financial messages, such as a database server, a hard disk drive, or flash memory.

In one embodiment, financial message repository 122 stores financial messages, routing slips for financial messages, and the status of financial messages. Financial message repository can be accessed by broker 104 and flow controller 106 in order to store or access information. State repository 124 stores status information for financial messages, corresponding to, at least in part, the parts of completed sub-flows 112 have been completed. In one embodiment, state repository 124 allows the status of financial messages to be recorded so that in the event that data processing environment 100 is shut down, the financial messages can continue processing when data processing environment 100 resumes. State repository 124 can communicate with flow controller 106 and financial message repository 122 to update and store the status of financial messages. Rules repository 126 stores rules information for financial messages that can be used to decide which activities (i.e. sub-flow 112) through which a financial message is processed, and which global variables may impact a financial message. The global variables information in rules repository 126 determines whether any modification is to be made to the processing of a financial message responsive to the global variables that correspond to the financial message (i.e., the value of the financial message, processing time relative to closing time, whether or not it is a bank working day). In one embodiment, rules server 108 accesses rules repository 126 to determine appropriate sub-flow 112 and the sequence of financial message processing steps. In another embodiment, a user on display 118 can utilize visualization module 116 on rules server 108 to update financial message information stored on rules repository 126.

Figure 2:
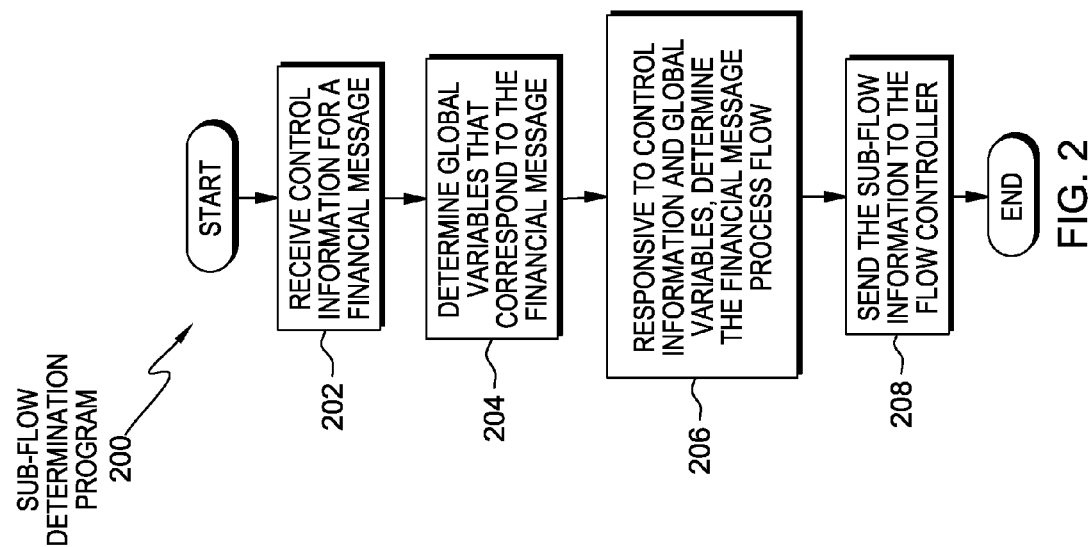
FIG. 2 is a flowchart depicting operational steps of a program for determining a appropriate sub-flow for a financial message, in accordance with an embodiment of the present invention.

FIG. 2 is a flowchart depicting operational steps of sub-flow determination program 200 in accordance with an exemplary embodiment of the present invention. In step 202, sub-flow determination program 200 receives control information for a financial message. In one embodiment, control information is sent to sub-flow determination program 200 by flow controller 106. The financial message control information directs the processing of a financial message. For example, control information can specify sub-flows 112 for a financial message, and a sequence of processing steps through the sub-flows. In one embodiment, the control information can be derived from the message sender, message recipient, message type, or other elements of the financial message.

In step 204, sub-flow determination program 200 determines global variables corresponding to the financial message. In one embodiment, sub-flow determination program 200 can recognize the global variables impacting the processing of the financial message.

In step 206, responsive to control information and global variables, sub-flow determination program 200 determines the financial message process flow. Sub-flow determination program 200 utilizes the control information and global variables to determine which sequence of activities through which a financial message will be processed. In an embodiment of the invention, sub-flow determination program 200 determines one sub-flow 112 that the financial message will be processed through. In an example when a financial message needs to be processed by more than one sub-flow 112, sub-flow determination program 200 may choose the sub-flow based on processing time, user preference, or another method. In this example, once the financial message completes the processing of sub-flow 112, sub-flow determination program 200 determines another sub-flow 112 for processing the financial message.

In step 208, sub-flow determination program 200 sends the sub-flow information to flow controller 106. The sub-flow information includes, at least in part, sub-flow 112 for processing the financial message, and the sequence of activities for processing the financial message while in the sub-flow. In an embodiment, sub-flow determination program 200 is executed for each financial message processed by flow processing engine 102 in order to determine the sub-flow information for the financial message.

Figure 3:
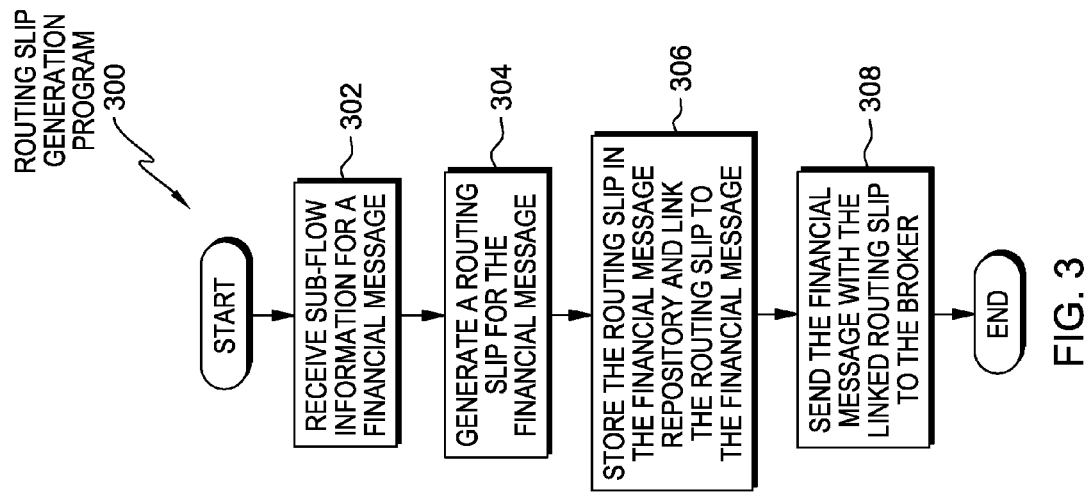
FIG. 3 is a flowchart depicting operational steps of a program for generating a routing slip for a financial message containing a appropriate sub-flow and a sequence of processing steps for the financial message, in accordance with an embodiment of the present invention.

FIG. 3 is a flowchart depicting operational steps of routing slip generation program 300 in accordance with an exemplary embodiment of the present invention. In step 302, routing slip generation program 300 receives sub-flow information for a financial message from rules server. In one embodiment, the sub-flow information received is sent to flow controller 106 by rules server 108 in step 208 of sub-flow determination program 200.

In step 304, routing slip generation program 300 generates a routing slip for the financial message. In one embodiment, the routing slip includes sub-flow 112 where the financial message is processed, and the sequence of processing steps within the chosen sub-flow. In step 306, routing slip generation program 300 stores the routing slip in the financial messages repository and links the routing slip to the financial message. The routing slip is stored in financial message repository 122, which allows the status of the financial message to be updated after a processing step is completed. In an embodiment, the routing slip is linked to the financial message and directs the financial message through processing. Routing slips can ensure that a financial message is processed correctly through sub-flow 112.

In step 308, routing slip generation program 300 sends the financial message with the linked routing slip to broker 104. In one embodiment, broker 104 receives the financial message with the linked routing slip and executes appropriate sub-flow 112. The linking of a routing slip to a financial message can allow for more accurate message processing and a higher amount of STP for financial messages. In an embodiment, routing slip generation program 300 is executed for each sub-flow 112 for which a financial message is processed. In an example when a user has modified the processing steps and information for a financial message, routing slip generation program 300 can dynamically generate a routing slip corresponding to the updated processing steps and information.

Figure 4:
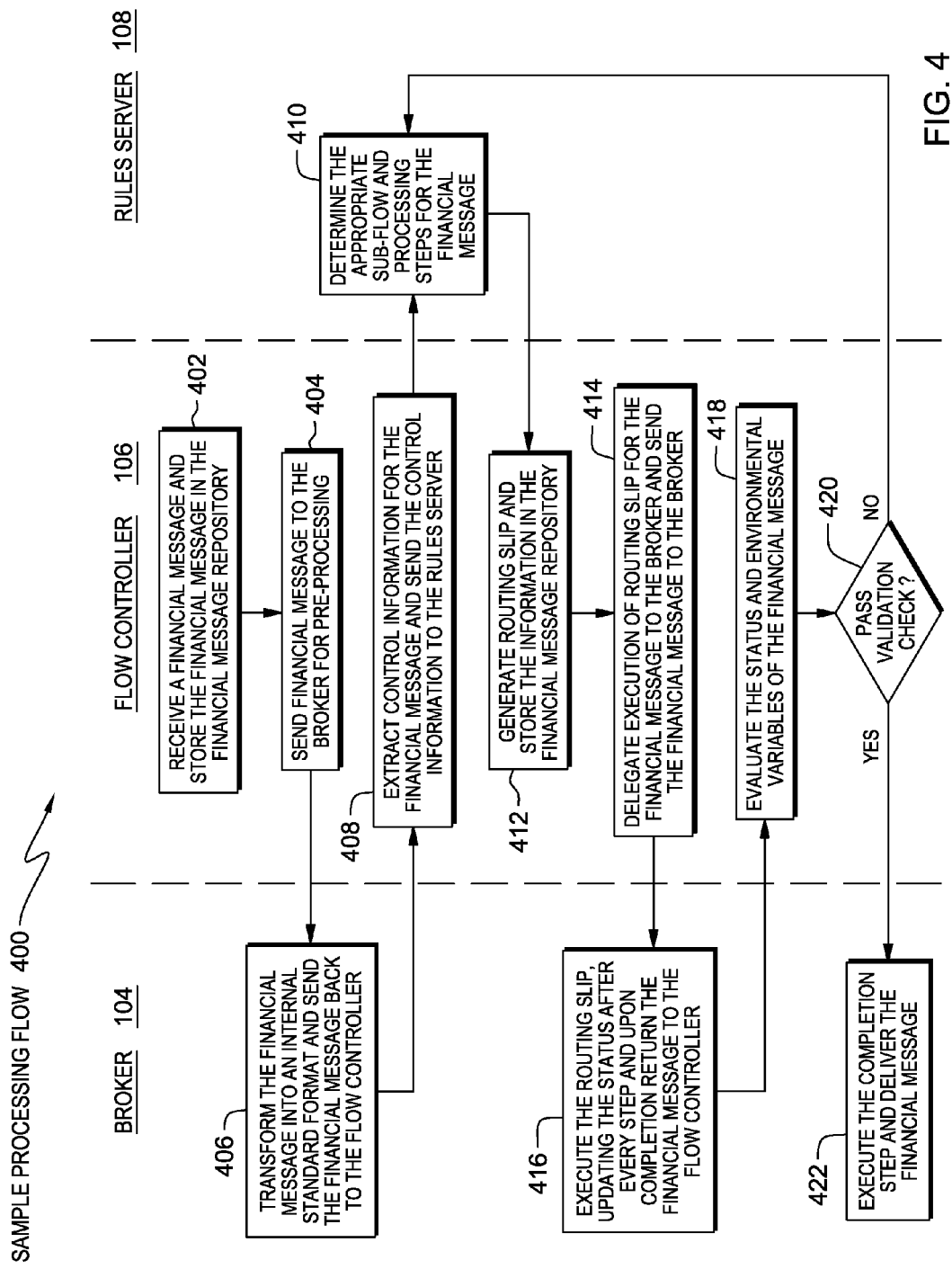
FIG. 4 is a flowchart depicting a sample processing flow of a financial message through data processing environment, in accordance with an embodiment of the present invention.

FIG. 4 is a flowchart depicting operational steps of sample processing flow 400 in accordance with an exemplary embodiment of the present invention. Sample processing flow 400 depicts an exemplary flow of a financial message through the elements of data processing environment 100 (broker 104, flow controller 106, and rules server 108).

In step 402, flow controller 106 receives a financial message input into data processing environment 100 and stores the financial message in financial message repository 122. In one embodiment, storing the financial message in financial message repository 122 saves the financial message in data processing environment 100 and can allow access to the financial message by elements of flow processing engine 102. In step 404, flow controller 106 sends the financial message to broker 104 for pre-processing.

In step 406, broker 104 transforms the financial message into an internal standard format (ISF) and sends the financial message back to flow controller 106. In one embodiment, transforming the financial message to ISF allows the financial message to be compatible with the elements of data processing environment 100. In an example, when a financial message is input into data processing environment 100, the financial message may be in a format that is not compatible with the elements of data processing environment 100. In such an example, broker 104 can transform the format of the financial message so that the elements of data processing environment 100 are able to process the financial message. In one embodiment, once the financial message is transformed to ISF, the transformed financial message proceeds through sample processing flow 400.

In step 408, flow controller 106 extracts control information for the financial message from the financial message, and sends the control information to rules server 108. In an embodiment discussed with regard to FIG. 1, some control information for a financial message can be defined by a user utilizing display 118 and visualization module 116. The control information for a financial message can be defined during the initial build time of the financial message.

In step 410, rules server 108 determines the appropriate sub-flow 112 and processing steps for the financial message. Sub-flow 112 is determined using global variables, control information, and the status of the financial message. The global variables that may impact the processing of the financial message are discussed in greater detail with regard to FIG. 1. The determination of the appropriate sub-flow 112 is accomplished through sub-flow determination program 200 and is discussed in greater detail with regard to FIG. 2.

In step 412, flow controller 106 generates a routing slip and stores the information in financial message repository 122. The generation of the routing slip is accomplished through routing slip generation program 300 and is discussed in greater detail with regard to FIG. 3. In step 414, flow controller 106 delegates execution of the routing slip for the financial message to broker 104 and sends the message to the broker.

In step 416, broker 104 executes the routing slip, updating the status after every step, and upon completion returns the financial message to flow controller 106. In an embodiment, broker 104 utilizes the routing slip to correctly process the financial message through sub-flow 112. The status of the financial message is updated in financial message repository 122 upon completion of each step in sub-flow 112.

In step 418, flow controller 106 evaluates the status and environmental variables of the financial message. The status and environmental variables are checked to ensure that the financial message was processed correctly. In step 420, flow controller 106 determines if the financial message meets the necessary validation requirements. In one example, flow controller 106 checks the status of the financial message in financial message repository 122 to see if all the necessary sub-flows 112 have been completed. If flow controller 106 does not validate the financial message, then the financial message is sent to the rules server 108 to complete step 410. In an example, a financial message may need to be processed by an additional sub-flow 112, thus failing the validation check. The financial message is then sent back to step 410. If the financial message is sent back to step 410, then the financial message repeats steps 410 through 420 and initial flow controller 106 determines that the financial message can be validated. Once the financial message passes the validation check, flow controller 106 sends the financial message to broker 104. In step 422, broker 104 executes the completion step and delivers the financial message. The completion step executed by broker 104 can include transferring the financial message to a financial communications gateway and sent to the desired destination.

Figure 5:
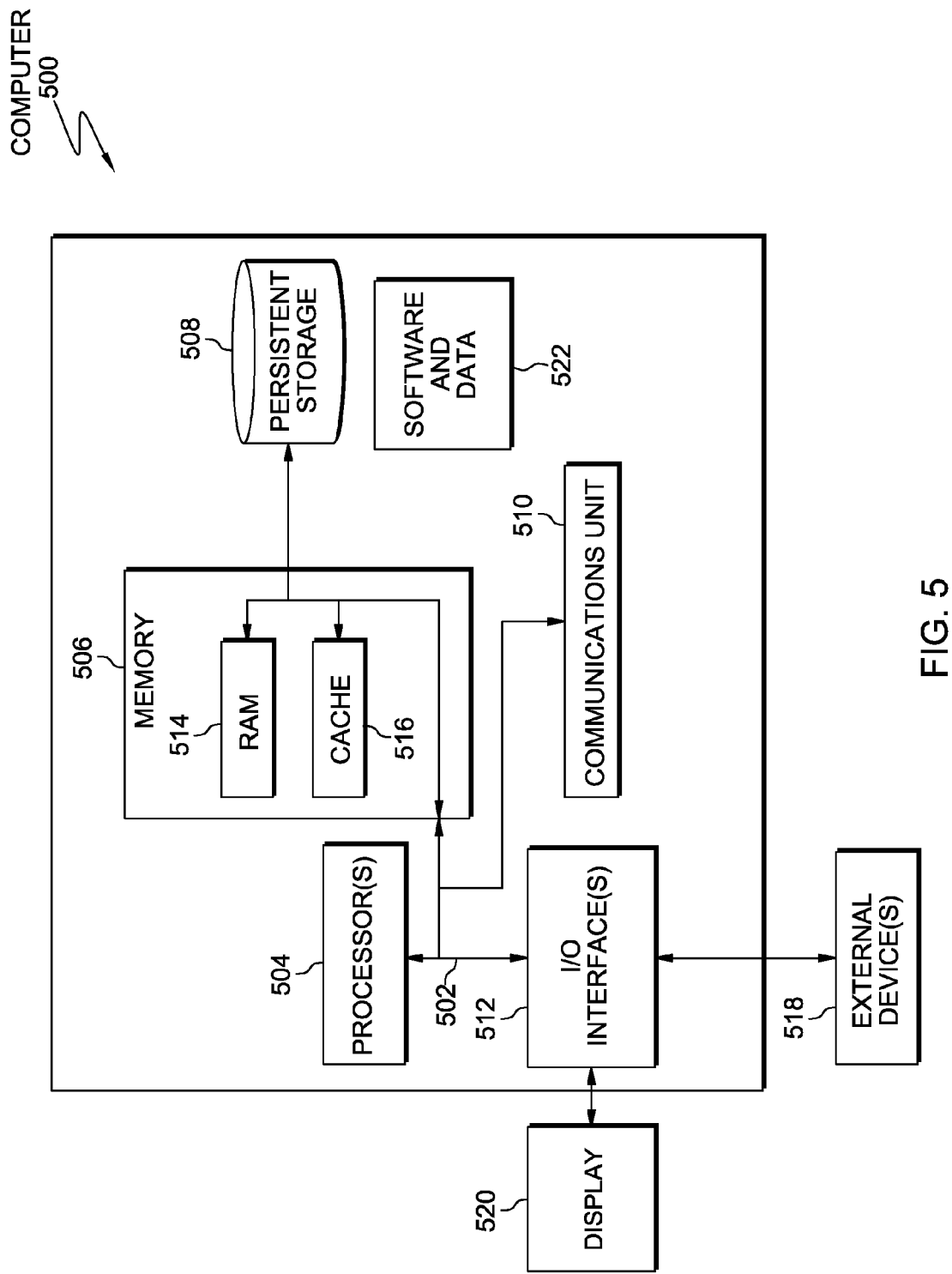
FIG. 5 depicts a block diagram of components of the computers of FIG. 1 in accordance with an embodiment of the present invention.

FIG. 5 depicts a block diagram of components computer 500, which is representative of broker 104, flow controller 106, and rules server 108, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Software and data 522 can be stored in persistent storage 508 for access and/or execution by processor(s) 504 via one or more memories of memory 506. With respect to broker 104, software and data 522 includes sub-flow 112. With respect to flow controller 106, software and data 522 includes routing slip generation program 300. With respect to rules server 108, software and data 522 includes visualization module 116 and sub-flow determination program 200.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a routing slip for a message, the method comprising:

determining, by a computer system, control information for a message, the control information indicating a type of transaction specified by the message, wherein determining the control information from the message includes extracting information indicating a message type from the message and deriving the control information for the message from the extracted information indicating the message type;

determining, by the computer system, an appropriate sub-flow to perform one or more processing steps on the message based on the determined control information, the sub-flow dictating a series of processing steps for the message;

generating automatically, by the computer system, a routing slip for the message based on the appropriate sub-flow and the determined control information, wherein the routing slip provides an order for executing one or more processing steps of the determined appropriate sub-flow, and wherein automatically generating the routing slip includes generating instructions to direct the message through processing steps of the determined appropriate sub-flow; and associating, by the computer system, the routing slip to the message.

2. The method of claim 1, further comprising:
executing, by the computer system, processing steps of the sub-flow according to the routing slip.

3. The method of claim 1, wherein the, the message is a financial message describing at least one financial transaction.

4. The method of claim 1, wherein automatically generating the routing slip for the message occurs without user interaction.

5. The method of claim 1, wherein the step of determining the appropriate sub-flow comprises the steps of:
determining, by the computer system, global variables relating to the message, the global variables comprising at least one value used in the transaction, and a processing time for the message, wherein determining the global variables relating to the message include identifying global variables in the message that impact processing of the message; and
utilizing, by the computer system, the control information and global variables to determine the appropriate sub-flow for the message.

6. The method of claim 1, wherein the step of determining the appropriate sub-flow for the message comprises the steps of:
sending by a first computer of the computer system, control information to a second computer of the computer system; and
receiving, by the first computer of the computer system, information specifying the appropriate sub-flow for the message from the second computer of the computer system.

7. The method of claim 2, wherein the step of executing processing steps of the sub-flow according to the routing slip comprises the step of:
sending, by a first computer of the computer system, the message and the routing slip to a second computer to execute the processing steps of the sub-flow.

8. The method of claim 2, further comprising the steps of:
upon completion of executing the processing steps of the sub-flow, determining, by the computer system, whether the message is to be processed by at least one additional sub-flow; and
responsive to determining the message is to be processed by at least one additional sub-flow, determining, by the computer system, the at least one additional appropriate sub-flow for the message.

9. A computer program product for generating a routing slip for a message, the computer program product comprising:
one or more computer-readable storage media and program instructions stored on the one or more computer-readable storage media, wherein execution of the program instructions by one or more processors of a computer system causes acts comprising:
determining control information for a message, the control information indicating a type of transaction specified by the message, wherein determining the control information from the message includes extracting information indicating a message type from the message and deriving the control information for the message from the extracted information indicating the message type;
determining an appropriate sub-flow to perform one or more processing steps on the message based on the determined control information, the sub-flow dictating a series of processing steps for the message;
generating automatically a routing slip for the message based on the appropriate sub-flow, wherein the routing slip provides an order for executing one or more processing steps of the determined appropriate sub-flow, and wherein automatically generating the routing slip includes generating instructions to direct the message through processing steps of the determined appropriate sub-flow; and
associating the routing slip to the message.

10. The computer program product of claim 9, wherein execution of the program instructions by one or more processors of a computer system causes additional acts comprising:
executing processing steps of the sub-flow according to the routing slip.

11. The computer program product of claim 9, the message is a financial message describing at least one financial transaction.

12. The computer program product of claim 9, wherein execution of the program instructions by one or more processors of a computer system causes additional acts comprising:
determining global variables relating to the message, the global variables comprising at least one value used in the transaction, and a processing time for the message, wherein determining the global variables relating to the message include identifying global variables in the message that impact processing of the message; and
utilizing the control information and global variables to determine at least one additional appropriate sub-flow for the message.

13. The computer program product of claim 9, wherein execution of the program instructions for determining the appropriate sub-flow for the message by one or more processors of a computer system causes additional acts comprising:
sending control information from a first computer to a second computer; and
receiving information specifying the appropriate sub-flow for the message on the first computer from the second computer.

14. The computer program product of claim 10, wherein execution of the program instructions for executing processing steps of the sub-flow according to the routing slip by one or more processors of a computer system causes additional acts comprising:
sending the message and the routing slip from a first computer to a second computer to execute the processing steps of the sub-flow.

15. The computer program product of claim 10, wherein execution of the program instructions by one or more processors of a computer system causes additional acts comprising:
upon completion of executing the processing steps of the sub-flow, determining whether the message is to be processed by at least one additional sub-flow; and responsive to determining the message is to be processed by at least one additional sub-flow, determining the at least one additional appropriate sub-flow for the message.

16. A computer system for generating a routing slip for a message, the computer system comprising:
one or more computer processors;
one or more computer-readable storage media;
program instructions stored on the one or more computer-readable storage media for execution by at least one of the one or more processors, wherein execution of the program instructions by the one or more processors of the computer system causes acts comprising:
determining control information for a message, the control information indicating a type of transaction specified by the message, wherein determining the control information from the message includes extracting information indicating a message type from the message and deriving the control information for the message from the extracted information indicating the message type;
determining an appropriate sub-flow to perform one or more processing steps on the message based on the determined control information, the sub-flow dictating a series of processing steps for the message;
generating automatically a routing slip for the message based on the appropriate sub-flow, wherein the routing slip provides an order for executing one or more processing steps of the determined appropriate sub-flow, and wherein automatically generating the routing slip includes generating instructions to direct the message through processing steps of the determined appropriate sub-flow; and
associating the routing slip to the message.

17. The computer system of claim 16, further comprising program instructions, stored on the one or more computer-readable storage media, wherein execution of the program instructions by the one or more processors of the computer system causes acts comprising:
executing processing steps of the sub-flow according to the routing slip.

18. The computer system of claim 16, wherein the message is a financial message describing at least one financial transaction.

19. The computer system of claim 16, further comprising program instructions, stored on the one or more computer-readable storage, wherein execution of the program instructions by the one or more processors of the computer system causes acts comprising:
determining global variables relating to the message, the global variables comprising at least one value used in the transaction, and a processing time for the message, wherein determining the global variables relating to the message include identifying global variables in the message that impact processing of the message; and
utilizing the control information and global variables to determine at least one additional appropriate sub-flow for the message.

20. The computer system of claim 16, wherein execution of the program instructions for determining the appropriate sub-flow for the message by the one or more processors of the computer system causes acts comprising:
sending control information from a first computer to a second computer; and
receiving information specifying the appropriate sub-flow for the message on the first computer from the second computer.

21. The computer system of claim 17, wherein execution of the program instructions for executing processing steps of the sub-flow according to the routing slip by the one or more processors of the computer system causes acts comprising:
sending the message and the routing slip from a first computer to a second computer to execute the processing steps of the sub-flow.

22. The computer system of claim 17, further comprising program instructions, stored on the one or more computer-readable storage media, wherein execution of the program instructions by the one or more processors of the computer system causes acts comprising:
upon completion of executing the processing steps of the sub-flow, determining whether the message is to be processed by at least one additional sub-flow; and
responsive to determining the message is to be processed by at least one additional sub-flow, determining the at least one additional appropriate sub-flow for the message.

* * * * *